(12) United States Patent
Renner

(10) Patent No.: US 9,965,533 B2
(45) Date of Patent: May 8, 2018

(54) REVERSE APPLICATION PROGRAMMING INTERFACE (API) ENDPOINT CREATION PROCESS AND STANDARDIZED SCHEMA

(71) Applicant: 6Connect, Inc., San Francisco, CA (US)

(72) Inventor: William R. Renner, McLean, VA (US)

(73) Assignee: 6CONNECT, INC., San Francisco, CA (US)

( * ) Notice: Subject to any disclaimer, the term of this patent is extended or adjusted under 35 U.S.C. 154(b) by 0 days. days.

(21) Appl. No.: 15/248,611

(22) Filed: Aug. 26, 2016

(65) Prior Publication Data

US 2017/0060573 A1    Mar. 2, 2017

Related U.S. Application Data

(60) Provisional application No. 62/211,581, filed on Aug. 28, 2015.

(51) Int. Cl.
*G06F 9/44* (2018.01)
*G06F 17/30* (2006.01)
*G06F 9/455* (2018.01)

(52) U.S. Cl.
CPC .... *G06F 17/30569* (2013.01); *G06F 9/45512* (2013.01); *G06F 8/33* (2013.01)

(58) Field of Classification Search
CPC ................................................ G06F 17/30569
USPC .................................. 717/101–108, 120–122
See application file for complete search history.

(56) References Cited

U.S. PATENT DOCUMENTS

| | | | | |
|---|---|---|---|---|
| 5,327,559 A | * | 7/1994 | Priven ..................... | G06F 9/465 718/101 |
| 5,721,912 A | * | 2/1998 | Stepczyk .......... | G06F 17/30569 |
| 5,991,535 A | * | 11/1999 | Fowlow .................. | G06F 8/24 717/107 |
| 6,405,364 B1 | * | 6/2002 | Bowman-Amuah ..... | G06F 8/20 717/101 |
| 6,442,748 B1 | * | 8/2002 | Bowman-Amuah ..... | G06F 8/20 717/108 |
| 6,662,357 B1 | * | 12/2003 | Bowman-Amuah ..... | G06F 8/20 717/120 |

(Continued)

OTHER PUBLICATIONS

Novick et al, "Extending Direct Manipulation in a Text Editor" m ACM, pp. 127-132, 2002.*

(Continued)

*Primary Examiner* — Anil Khatri
(74) *Attorney, Agent, or Firm* — Thomas Schneck

(57) ABSTRACT

A reverse API system is provided wherein data retrieved from disparate data sources, including legacy information in obsolete formats, are standardized and combined. An interactive text editor software tool allows an administrator to compose or edit standardization schema that include data source formulas which identify the data locations and any needed access protocols and that also include standardization functions which define transformations and other data handling instructions whereby retrieved data is standardized, unified and optionally enhanced by the system prior to delivery to a requestor. Requestors invoke the composed schema stored in a library, which invocation then triggers the retrieval and standardization of the data by the system executing the data source formulas and standardization functions associated with that selected schema.

16 Claims, 9 Drawing Sheets

(56) References Cited

U.S. PATENT DOCUMENTS

| | | | | |
|---|---|---|---|---|
| 6,957,416 B2* | 10/2005 | Adams | ............... | G06F 17/2247<br>715/201 |
| 7,131,111 B2* | 10/2006 | Passanisi | ............... | G06F 8/36<br>717/121 |
| 7,373,636 B2* | 5/2008 | Barry | ............... | G06F 11/3672<br>714/E11.208 |
| 7,451,432 B2* | 11/2008 | Shukla | ............... | G06F 8/36<br>717/105 |
| 7,571,426 B2* | 8/2009 | Carroll, Jr. | ............... | G06F 8/38<br>717/104 |
| 7,877,731 B2* | 1/2011 | Bekelman | ............... | G06F 8/10<br>717/105 |
| 7,895,566 B2* | 2/2011 | Shenfield | ............... | G06F 8/20<br>717/106 |
| 8,086,995 B2* | 12/2011 | Luo | ............... | G06F 8/38<br>717/105 |
| 8,312,382 B2* | 11/2012 | Gilboa | ............... | G06F 8/38<br>715/762 |
| 8,549,472 B1* | 10/2013 | Tilwani | ............... | G06F 17/218<br>709/208 |
| 8,655,998 B1* | 2/2014 | Raju | ............... | H04L 29/08072<br>707/999.202 |
| 9,189,244 B2* | 11/2015 | McMahon | ............... | G06F 21/60 |

OTHER PUBLICATIONS

Ko et al, "Design Requirements for More Flexible Structured Editors from a Study of Programmers' Text Editing", ACM, pp. 1557-1560, 2005.*

Arefi et al, "Automatically Generating Visual Syntax-Directed Editors", Communication of the ACM, vol. 33, No. 3, pp. 349-360, 1990.*

Ignat et al, "Grouping in Collaborative Graphical Editors", ACM, vol. 6, issue 3, pp. 447-456, 2004.*

Novick et al, "Extending Direct Manipulation in a Text Editor", ACM, pp. 127-132, 2002.*

Spangler et al, "Interactive Methods for Taxonomy Editing and Validation", ACM, pp. 665-668, 2002.*

* cited by examiner

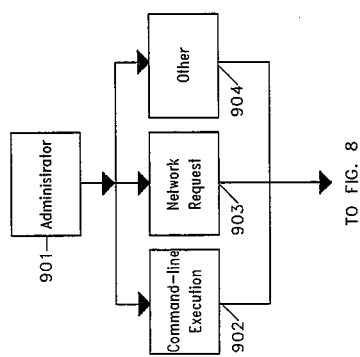

REVERSE APPLICATION PROGRAMMING INTERFACE (API) ENDPOINT CREATION PROCESS AND STANDARDIZED SCHEMA

CROSS-REFERENCE TO RELATED APPLICATION

The present invention claims priority under 35 U.S.C. 119(e) from prior U.S. provisional application 62/211,581 filed Aug. 28, 2015.

TECHNICAL FIELD

The present invention relates to computer-mediated systems with associated software tools whereby data is accessed and delivered to requestors in a unified form.

BACKGROUND ART

Different sources may gather and distribute data with various measurement units and data formats that can be difficult for an end user to integrate. Likewise, rapidly evolving network environments create changes in data formatting that can leave necessary legacy information in a condition that is less useful than the newer data. Transformation tools are required to standardize and unify data streams obtained from the different current and legacy sources.

Another situation may exist where an IT department can lose the ability to understand and control its own software tools, or be required to integrate acquired tools it may not have time to fully understand. A typical scenario where this situation might arise is with corporate mergers and departmental reorganizations, or when natural employee turnover leaves certain production-critical source code maintenance projects orphaned or poorly-understood.

An ability to adapt to changing environments, e.g. by helping integrate and extend existing functionality from a variety of sources (APIs, command line programs, raw data readouts, etc.) so that they can be effectively used by an organization without requiring that the source code of these legacy programs be understood, would be very useful.

SUMMARY DISCLOSURE

A Reverse API process is one that is characterized by the integration and extension of external data sources into a form available for downstream consumers. It is a middleware process designed to extend the usable lifetime of legacy applications or to easily unify the functionality of disparate applications without having to involve these programs' creators or interact with their source code in any way.

A key step in the Reverse API process is the creation of a Standardization Schema (Box 107; FIG. 8). The Reverse API provides an interactive feedback loop that guides the Administrator through the creation and refinement of a specific data set that contains:
1) A Data Source Formula which contains either the location(s) of the data sources to be drawn upon or template(s) which can be resolved to said location(s)
2) The protocol(s) by which these sources are accessed
3) The process(es) by which the raw data stream(s) is/are made useful
4) The process by which multiple data streams are folded together, if needed Together, the data above is known as a "Standardization Schema." These Schemas are stored by the Reverse API, typically in a database, and made available to be executed at a later time by a system user known as a Requestor.

While it is possible to execute a Reverse API Standardization Schema by itself and treat the Reverse API as a data gathering/processing step, it is frequently advantageous to provide additional value-adding steps before the data is returned to the Requestor. These "enhancement" steps (Box 105; FIG. 6) may include things like gating the whole or parts of the Standardization Schema behind policy barriers to provide granular, supervised access to data which, in its raw form, may be completely open and available. Other enhancement steps with wide application include automatic logging, rate measuring and alerting, and the introduction of related data known to the Reverse API system itself into the finished data stream.

Accordingly, one embodiment of the invention provides a computer-mediated system for gathering, standardizing, unifying and delivering a user-desired data set from one or more data source locations. This includes an interactive text editor software tool executed on a computer for use by an administrator to compose and maintain a library of standardization schema. Each schema stored in the library contains a set of data source formulas providing instructions for the system to locate and retrieve data from one or more data sources. Each schema also contains a set of data standardization functions providing instructions for the system to handle and process data retrieved from the data sources. Additionally, a requestor software tool which is executed on the same or, more usually, another computer of the system accesses the library such that a requestor invokes a selected one of the stored schema. The same or another computer of the system, responsive to a requestor invoked schema, executes the set of data source formulas of the invoked schema so as to retrieve data and also executes the set of data standardization functions of the invoked schema so as to standardize and unify the retrieved data for delivery to the requestor.

BRIEF DESCRIPTION OF THE DRAWINGS

FIG. 9 is a block diagram of Reverse API system details according to FIG. 1 which relate specifically to an Administrator.

DETAILED DESCRIPTION

Figure 1:
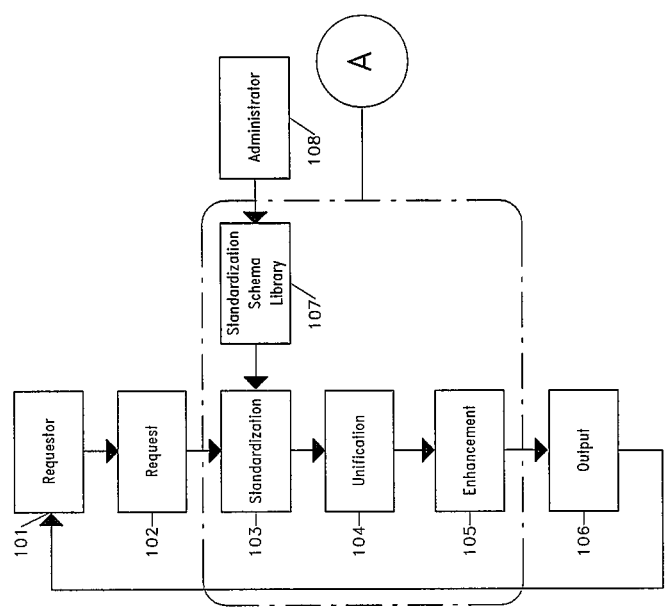
FIG. 1 is a high level block diagram of a Reverse API system in accord with the present invention.

An overview of the Reverse API process is described in FIG. 1 and is expanded upon in subsequent diagrams. A full description of the Reverse API process features two individuals: an Administrator (Box 108) and a Requestor (Box 101), though in practice the two may be the same person at different times. Both these entities are represented in the diagram, and the boundaries of the Reverse API application are denoted by FIG. 1, Box A. The Administrator uses the Interactive Standardization Schema Creation Process (Box 107) to create and refine a Standardization Schema which is then employed by the Requestor (Box 102) to gather data or effect an external change. After a Standardization Schema is selected and executed (Box 103), its various data streams are unified (Box 104) if necessary before the data is optionally enhanced (Box 105) and passed back to the Requestor (Box 106).

Figure 2:
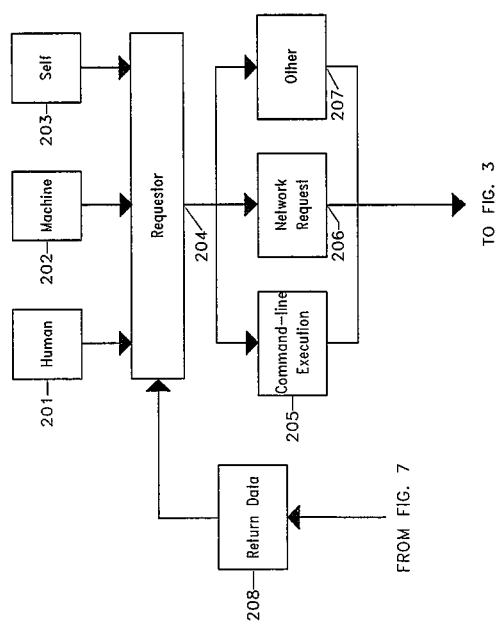
FIG. 2 is a block diagram of Reverse API system details according to FIG. 1 which relate specifically to a Requestor.

The details of the Reverse API begin with FIG. 2: Reverse API Detail—Requestor, which is an expansion of Box 101. This figure shows the types of entities which are expected to initiate a Reverse API data request: a human user making a specific request (Box 201), a machine making a Reverse API request as part of some automated process (Box 202), or even another Reverse API process calling into the system recursively (Box 203). While it is not necessary that a Reverse API process support all these disparate Requestor types, it is necessary that it support at least one method (Box 204) and that a Reverse API Request be produced by some method like a network request (Box 206), command-line execution (Box 205), or by some other method (Box 207).

Figure 3:
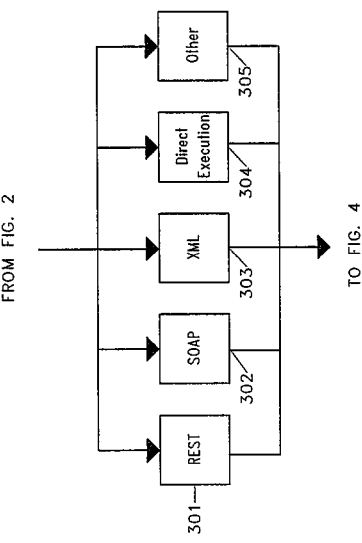
FIG. 3 is a block diagram of Reverse API system details according to FIG. 1 which relate specifically to a Request invoked by the Requestor.

The details of the Reverse API Request are continued in FIG. 3: Reverse API Detail—Request. This figure outlines some of the data transport methods expected to be used to deliver the Reverse API Request from the Requestor (Box 101) to the Reverse API Application (FIG. 1, Box A). Anticipated methods include via a REST service (Box 301), a SOAP application (Box 302), a submitted XML document (Box 303), directly via passed parameters (Box 304), or some other method (Box 305). As with the different types of Requestors (Boxes 201-203) an individual Reverse API implementation is not expected to support each of these different transport methods, but it must include at least one method of delivering a Request to the Reverse API Application (FIG. 1, Box A).

Figure 4:
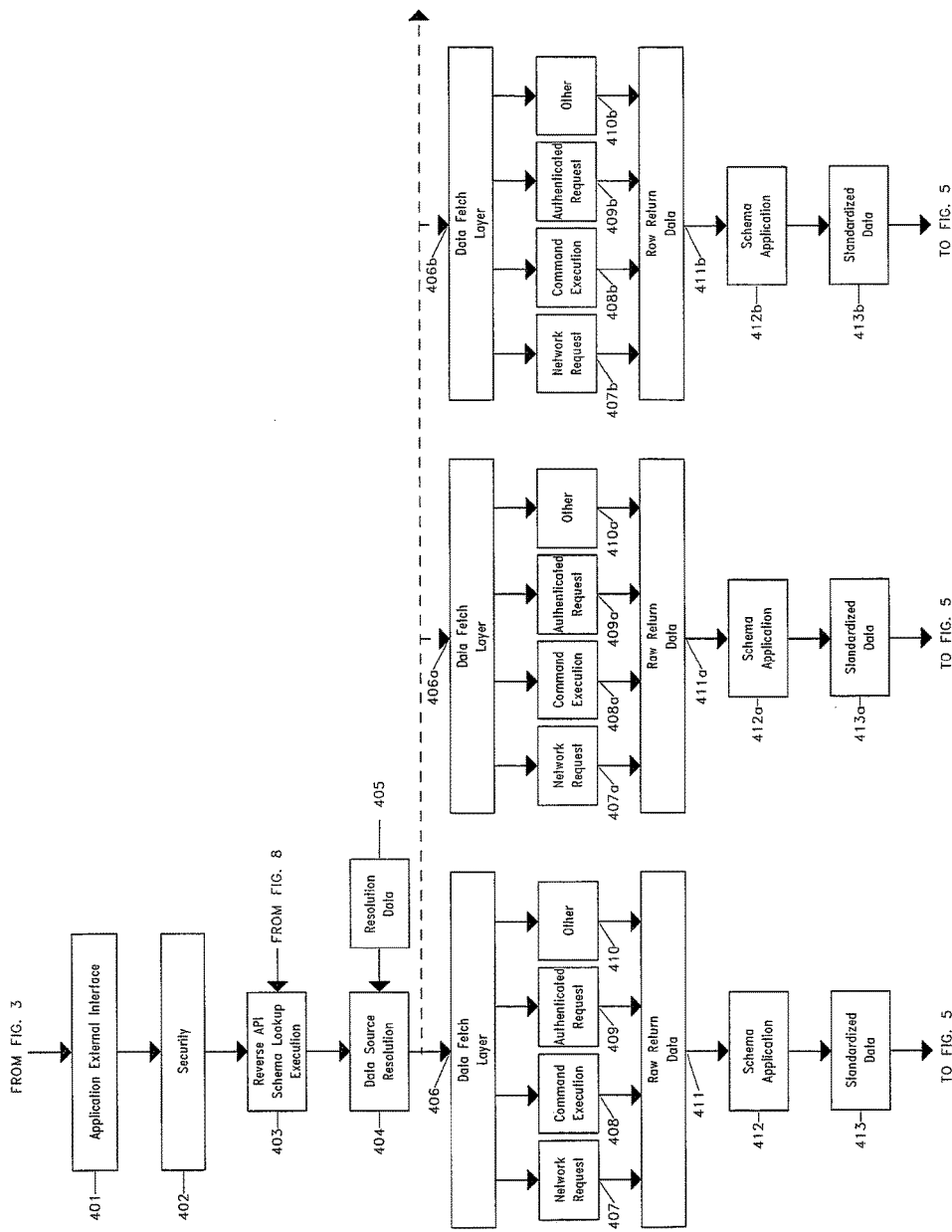
FIGS. 4 through 6 are block diagrams of Reverse API system details according to FIG. 1 which relate specifically to the Data Standardization functions of standardization, unification and enhancement of data streams retrieved according to Data Source Formulas.

FIG. 4: Reverse API Detail—Standardization enumerates the process which begins once a Reverse API Request (Box 102) is transported (FIG. 3) to the boundary of the Reverse API Application (Box 401). Once a request is received a security scan may be performed to validate the command and its parameters (Box 402) before the system formally reads the Request and determines the Unique Identifier which informs the Reverse API system of which Standardization Schema the Request is referring to (Box 403). The system then retrieves the appropriate Standardization Schema from the Standardization Schema & Formula Library (Box 820) and resolves the Data Source Location(s) from the supplied Data Source Formula(s) (Box 404) using resolution data (Box 405) stored within the Reverse API system or carried along in the Request, if necessary. The system then repeats this process (FIG. 4, dashed line) for as many Data Source Locations as are described within the particular Standardization Schema and passes the resolved Locations to as many Data Fetch Layers as required (Boxes 406, 406a, 406b, and so on).

The Reverse API then retrieves the data denoted by the Data Source Location(s) via one of a number of possible transport mechanisms, as specified by the Standardization Schema. Possible transport mechanisms include network requests (Box 407), local command execution (Box 408), remote authenticated command execution (Box 409), or similar methods (Box 410). As before, no single Reverse API implementation is required to implement any particular method of receiving and fetching data, but it the Reverse API process does require at least one. This request or command will result in a blob of returned data (Box 411) which is then processed as required by the Standardization Schema (Box 412) to result in fully standardized data (Box 413).

Figure 5:
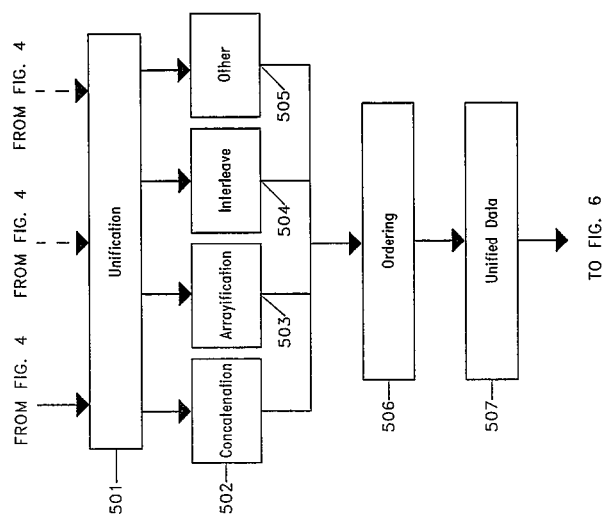

FIG. 5: Reverse API Detail—Unification takes over from the Standardization step in FIG. 4. The Unification step can be omitted or trivialized in the case of a single-source Standardization Schema, but even a single source can benefit from the basic data manipulation tasks described in Boxes 502-506. As the external Data Fetch processes (Boxes 406-413) return with their fully translated payloads they are unified into a single data stream (Box 501) by means of one or several processes as described by the Standardization Schema, such as concatenation (Box 502), arrayification (Box 503), interleaving (Box 504), or similar (Box 505). After the data streams are combined the data is optionally ordered (Box 506) resulting in fully unified data (Box 507).

Figure 6:
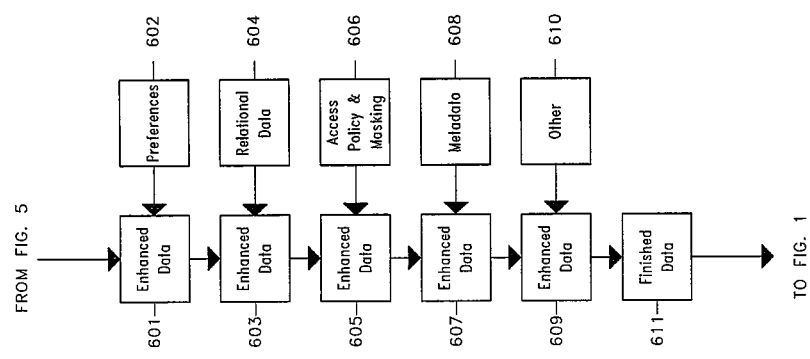

Lastly, the unified data passes into an optional data-enhancement phase described by FIG. 6: Reverse API Detail—Enhancement. This is where any value-added data additions or transformations are inserted into the data stream (FIG. 6, Boxes 601, 603, 605, 607, 609) before it is passed back to the Requestor (Box 611). Such enhancements currently in-use include Requestor-specific preference-based alterations (Box 602), the addition of related data based off information found/detected in the data stream (Box 604), granular data masking/obfuscation based on access policy (Box 606), and the addition of metadata possessed by the Reverse API system (Box 608). Other useful enhancements are expected to be discovered and added with regularity (Box 610).

Figure 7:
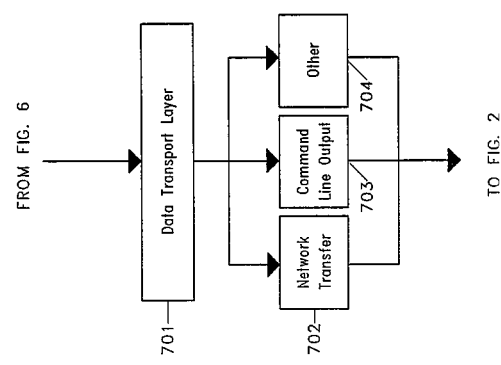
FIG. 7 is a block diagram of Reverse API system details according to FIG. 1 relating to delivery of data to the Requestor.

FIG. 7: Reverse API Detail—Output describes the process whereby the fully standardized, unified, and enhanced data (Box 611) is returned to the Data Transport Layer (Box 701), where it returns to the Requestor by any number of methods and formats, like SOAP (Box 702), XML (Box 703) or another format (Box 704). As before, the Reverse API is not concerned with exactly how data is transported to and away from it, but it does need at least one external interface.

The above description of FIGS. 2-7 describes the processes whereby a Requestor submitting a Request to the Reverse API system receives a response in return. Pivotal to this process is a crucial step indicated by Box 303 where the system interprets the Reverse API Request and retrieves a Standardization Schema from the Standardization Schema & Data Formula Library, which is typically housed in a local database. An important feature of a Reverse API system is the process by which the contents of this Library are constructed, refined, and expanded, which is a process that operates'along its own data path and is expected to take place well before the Requestor makes a request of the system.

An individual who adds to or maintains the Reverse API Standardization Schema Library is known as an Administrator, and the beginnings of the Administrator's data path is depicted in Box 901. The Administrator interacts with the Reverse API system through one or more of a number of possible methods, including command-line program execution (Box 902), networked requests (including web-based access) (Box 903), or other such methods (Box 904). As with the Requestor and the Reverse API as a whole, no particular method of access is important so long as one exists.

Figure 8:
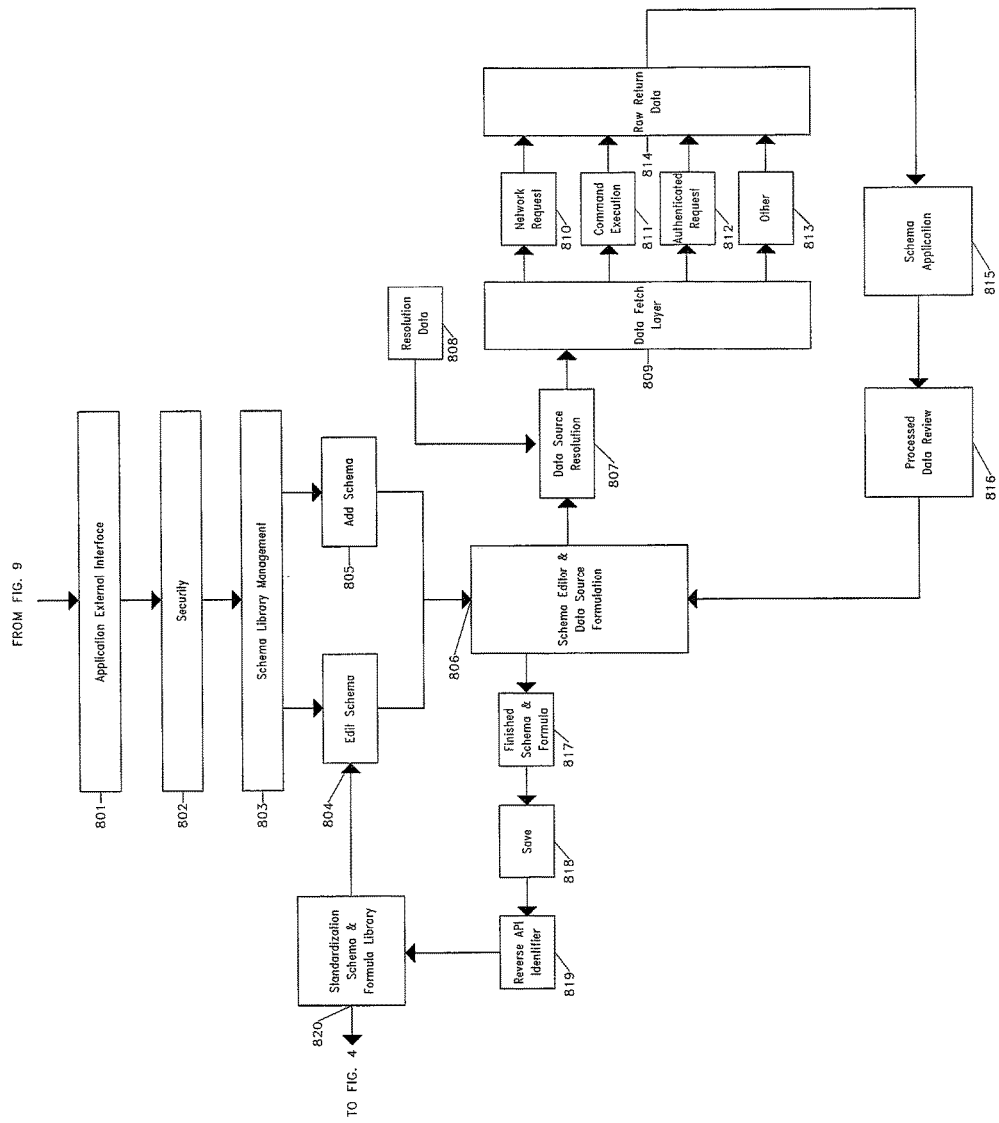
FIG. 8 is a block diagram of Reverse API system details of an interactive text editing software tool for an Administrator to compose and/or edit Standardization Schema for a Library of such Schema that can be invoked by a Requestor.

FIG. 8: Standardization Schema Generation & Library describes the process by which an Administrator authenticates (Boxes 801-802) against a Reverse API application and then uses its guided Standardization Schema creation process (Boxes 803-819) to correctly compose one or more Data Location Formulas and then to compose a function which will transform its return into something useful.

The system begins with a general Schema Management screen (Box 803) which presents typical management options like "create new" (Box 805), "edit existing" (Box 806), and other miscellaneous management tasks (export, delete, import, etc.) as required by the specific Reverse API implementation. Either adding-new or editing-existing prompts the Administrator with a text editor for supplying the Standardization Function and another area to supply the Data Source Formula (Box 806). Once this data is provided, the system prompts for values necessary to fully resolve the Data Source Formula (if needed) and performs a test-pull of data from that Data Source (Box 807). As in other places, this data fetch (Box 809) can be performed in any number of ways, including via a network request (Box 810), an executed application (Box 811), a remote authenticated request (Box 812), or some other data transport mechanism (Box 813) to result in a raw blob of return data passed back to the system (Box 814).

The proposed Standardization Function described by the Administrator in Box 806 is then applied to the returned data (along with any previous data streams if this is a Reverse API call involving multiple data streams; see FIG. 4) and that tentatively-resolved data (Box 815) is presented to the Administrator for review (Box 816) in a return to the state represented in Box 806. If the Administrator is not satisfied with the result of the transformation they can alter either the Data Source Formula or the Standardization Function and then proceed with the cycle represented by Boxes 807-816 as many times as are needed to achieve the desired results. Also, if this is a Reverse API call involving multiple data streams, the Administrator can embark on the Boxes 807-816 cycle for each of the streams which will be unified by this Reverse API call, and specify how each new stream is to be unified with the previous.

When the Administrator is satisfied with the performance of the Standardization Schema (Box 817) the Standardization Schema & Data Formula is saved by the Reverse API system (Box 818), typically in a database. After the save, the Reverse API system provides the Administrator with a Unique Identifier (Box 819) which serves to reference this particular Standardization Schema and by which Requestors (Box 101) can invoke this specific process at a later date. The finished Standardization Schema & Data Source Formula then resides in the Standardization Schema & Data Source Formula Library (Box 820) until called upon by a Requestor process, edited by an Administrator, or deleted by an Administrator.

Overview of the Steps

The goal of a Reverse API is to smoothly adjust to new and changing data inputs as they arise over time. The key to the system is its ability to adapt to new systems and to incorporate and standardize data streams whose natures cannot be known beforehand.

The general process can be divided into two sections, both of which must be present in a full Reverse API implementation. The first section is performed by an Administrative user and involves composing and preparing packets of instructions known as "Standardization Schemas," which tell the Reverse API system how to handle data entering it from the outside, as well as "Data Location Formulas," which are optionally-parameterized instructions for retrieving a blob of interesting data. The second section revolves around system users termed Requestors who invoke these Standardization Schemas and receive the resultant data.

For an example let us imagine a series of temperature sensors posted atop high buildings all across a city, each one slightly different from every other. One sensor might measure in units of Fahrenheit, while the next might measure in Celsius, while a third might return its measurements in terms of voltage potentials or partial pressures or any number of means. If an Administrator was charged with providing a service that queried each sensor and reported the average between them he might compose a translation format to convert each one into Celsius and then report the average on that. This translation process for a sensor (or sensors) is a Standardization Function, the location of each sensor and the instructions on how to read it is the Data Location Formula, and together with all the Functions and Locations for all the sensors they compose a Standardization Schema. A Reverse API process is a tool that assists in the creation and organization of Standardization Schemas and puts them to work for a general usership.

Administrative Functions

The Administrative functions of a Reverse API process revolve around an Administrative user building and refining Standardization Schemas based on an interactive feedback loop. The feedback loop allows the Administrator to quickly see the effects their Standardization Schema is having upon the data from its specified location(s).

A Standardization Schema is described by the following:
1) A Data Source Formula which contains either the location(s) of the data sources to be drawn upon or template(s) which can be resolved to said location(s)
2) The protocol(s) by which these sources are accessed
3) The process(es) by which the raw data stream(s) is/are made useful
4) The process by which multiple data streams are folded together, if needed The method by which an Administrator connects to a Reverse API system (FIG. 9) is not particularly important. A Reverse API system is equally at home in a browser-based internet application as in a parameter-driven command-line format. As this suite of functions is termed "Administrative" it implies a level of heightened privileges, so it is expected that some authentication and security (Boxes 801-802) may be included between the Reverse API application boundary and the Reverse API administration functions, but the exact form and thoroughness of this security is not greatly important.

The first truly crucial piece of a Reverse API comes in the form of a Schema Library Management Interface (Box 803) that presents the Administrator with a number of options regarding Standardization Schemas and their Data Formulas. Most important are the "Create a Schema" and "Edit a Schema," though depending on how extensive and featured a particular Reverse API implementation might need to be other options like re-naming, importing, exporting, copying, re-numbering, etc. might be deemed useful.

It is worthwhile to note that a system lacking both "Create" and "Edit" options would not be a Reverse API implementation (though lacking only one indicates a degenerate implementation and may still qualify). Static data translation libraries are not a new invention, and neither are libraries that require an outside party to keep updated. A Reverse API lets an Administrative user have full control over the contents of the Standardization Schema Library, adding to it and altering it as they please.

If the Administrator chooses to Create a new Standardization Schema they would be presented with several choices, any of which may be curtailed or abbreviated to fit the requirements of a particular environment:
1) To choose the programming language that the Schema will utilize (ex: JavaScript)
2) To provide a Data Location Formula which may or may not require its own parameters
3) To provide a Standardization Function in the language chosen in (1) which transforms the data provided by (2) into a useful state
4) To repeat steps (1) through (3) for as many different data streams as this Standardization Schema might require, with options on how to unify the streams If the user chooses to instead Edit an existing Standardization Schema the same list applies, but the initial values are populated with the existing properties of the selected Schema.

Some choices may be omitted in the case where the Reverse API only supports a single option (i.e., only supporting JavaScript or a single method of data retrieval). In this case, the Reverse API implementation will simply treat those values as known constants.

On a fundamental level a Standardization Function takes as input the contents of a location indicated by a Data. Location Formula and returns translated, transcribed, isolated, or otherwise formatted data. This function can be written in any programming language, though currently scripting languages such as JavaScript are favored for their ease of execution. The only limitation to the scope and breadth of this function is the language in which it is written. A Reverse API will typically provide an editor tailored to the chosen language complete with a pre-populated shell of the Standardization Function and some text indicating what the Administrator is expected to do. The key job of the Reverse API is to assist the Administrator in the Standardization Schema creation process. Functionality is provided for real-time or near-real-time testing during the development of a Standardization Function (Boxes 807-816) whereby the Administrator provides whatever parameters (addresses, passwords, etc.) are needed to fully resolve a Data Location Formula so the Reverse API system can pull in the contents from that location, feed said contents through the work-in-progress Standardization Function before presenting the results to the Administrator. In this fashion the Administrator receives active feedback on how their Standardization Function is modifying the data being retrieved, assisting them in finding the best way to transform the incoming data. It is often also instructive to present the raw data alongside the data returned by the Standardization function, and in the case of very large data returns truncating the displayed data to a handful of lines keeps with the goal of showing specific changes to a data stream as the transformation function is modified.

Alongside the Standardization Function is the Data Location Formula. In its simplest form the Data Location Formula is simply the location of a data resource: a web address, a port, a file on the operating system, or a device. In the simplest case the Data Location Formula is a constant, unambiguous, complete address of a piece of data and the Reverse API system simply retrieves the information found there and passes it to the Standardization Function. In a more complicated case the Data Location Formula might have parameters to be filled in, like so:
http://www.example.com/[$1]
/var/log/[$i].log
curl--user [$1]:[$2] http://www.example.com In each of these examples pieces of information are missing and are instead represented as variable placeholders (e.g., [$1], [$2]). These examples might fully resolve like so:
http://www.example.com/sensor1
/var/log/sensor3.log
curl--user username:password http://www.example.com The Administrator supplies the variable-included format and the variables are replaced with their true values when the Requestor executes the Reverse API command (Box 404). The specific rubric by which variables are detected and re-assigned isn't particularly important; a system based on the text string "[$x]" works just as well as one based on "{{x}}" or "$x" so long as it adheres to some system of ordering and replacing variables as needed. The rules used to fully resolve a Data Location Formula are expected to be kept by the Reverse API in some internal format particular to the needs of a Reverse API implementation, and to be known to the Requestor.

Templating the Data Locations Formulas in this fashion allows a single Standardization Schema endpoint serve multiple purposes. For example, if a prepared Standardization Schema reads a temperature in Kelvin and converts it to Celsius, it could then also accept a second parameter that indicates exactly which sensor should be read. In this fashion a, single Schema can be used to cover an entire class of sensors instead of just a single sensor. The data needed to fully resolve a Data Location Formula may be supplied by the Requestor within or alongside the Request, or it might be stored internally in the Reverse API itself and applied via the logic of the specific Reverse API implementation.

After Administrator is satisfied with the performance of their Standardization Function they may have the option of adding an additional Standardization Function & Data Location Formula by engaging in the same resolve-fetch-process cycle and specifying how this new formatted data stream is to be unified with the previous. There is no intended limit as to how many resolve, fetch, and process cycles may be packed into a single Standardization Schema.

After the Standardization Schema is fully complete and behaving as the Administrator requires they can then save the Schema in the Standardization Schema Library (Box 820). Each Standardization Schema will be assigned a Unique Identifier within in the Library which will allow Requestors to refer to a specific Standardization Schema as needed. The Administrator may then distribute this Unique Identifier to their downstream users.

Requestor Functions

While the previous section concentrated on the process by which Standardization Schemas are created, this section describes how they are used. Just as the individual who creates a Standardization Schema is referred to as an Administrator, the individual or machine (Box 101) who requests a Schema be executed from the Reverse API is called the Requestor. When the Requestor submits a Request to the Reverse API, the system identifies the Unique Identifier contained within, finds the associated Standardization Schema, executes it, manipulates, arranges, and enhances the resultant data before returning the result(s) to the Requestor.

As with the Administrative interface, the precise method a Requestor uses to interact with the Reverse API is not important (Boxes 205-207). It can be via a local commands executed from a prompt or by a network request, or by some other method. What is relevant is that the Request (FIG. 3) contains a Unique Identifier that refers to a Standardization Schema and includes all the data needed to completely resolve the Data Location Formula(s) within that Schema.

For example, a simple request may arrive by way of a HTTP call and contain the following information:
id=5
which might indicate that Standardization Schema #5 is to be executed. A more complicated call including data to be supplied to a Data Location Formula might look like this:
id=5&data1=thursday&data2=503
or like this:
id=5&data={'0':'thursday','1':503}

The specific format of the data is not essential to the Reverse API process. What is important is that the request identifies the Schema to be executed and that the Request's data section conform to some pre-agreed format that can be employed to fully resolve a Data Location Formula. The details of this agreement are likely to vary based on the programming language a specific instance of a Reverse API process is itself written in, and are not important so long as the end state is a uniquely identified Standardization Schema and a fully resolved Data Location.

Insufficient requests, or requests whose Unique Identifier do not target a known Standardization Schema, return errors.

Once the Reverse API system has fully parsed the Request, retrieved the appropriate Standardization Schema, and has fully resolved the Data Location Formula (Boxes 403-405) it can begin retrieving data from the Data Locations. This process can be done serially, one at a time, or can be managed by launching several sub-processes which each handle a single Data Location (Box 406, 406a, 406b). Once all the data requests return, or individually as they return, the retrieved blobs of data are fed into the Standardization Function(s) defined by the Administrator in Boxes 806-816.

The standardized data streams are then passed into the Unification stage (FIG. 5), where they are combined back into a single return format based on the specifications of the Standardization Schema. Possible examples include concatenation of data, or arrayification of the data, or a specific ordering schema as specified, or a mathematical operation over the returned data set. In this step bulk data processing techniques may be employed as needed by the implementers of the Reverse API system, the preferences of the Administrator as expressed in the Standardization Schema, and the preferences of the Requestor as known to the Reverse API system. Such processes may include the ordering of data, the removal of redundant entries, or other processes.

The standardized, unified data stream is then passed to an Enhancement step (FIG. 6) where it can receive all manner of transformations. This is the section of the Reverse API process where "value add" data processing and manipulation steps can go. For instance, the Reverse API system might be able to identify the Requestor and apply their individualized preferences to the data stream (ex: applying favored numerical format standards, converting between numerical formats, reframing times into the Requestor's time zone, filtering of zeros or null values, etc.). Other enhancement operations might be the inclusion of relational data specific to the Data Location (GPS coordinates, contact information, etc.), the filtering of data that the Requestor is not authorized to receive and the application of metadata such as the timestamp of the Request and the time taken to fully process the Standardization Schema, in whole or in part. The permutations on this Enhancement step are expected to flex with the needs of the specific Reverse API implementation.

After the Enhancement step is complete the standardized, unified, enhanced data stream is passed back to the Requestor (FIG. 7). As with the incoming data, the precise manner in which the outgoing data is returned is not important to the Reverse API process so long as the data makes its way back to the Requestor.

Alternate Implementations

Although the full implementation of a Reverse API system (FIG. 1) is the most powerful, it is not the only configuration possible. The key features of a Reverse API system are:

1) A means for an Administration to create a Standardization Schema, including:
a) an interactive process to incrementally refine the Schema
b) a means of accepting and testing Data Location Formulas
c) a means of accepting and testing Standardization Functions
d) a means of uniquely referring to the finished, stored Schema
2) A means for a Requestor to execute a Standardization Schema
3) A means of retrieving data based on a Data Location Formula
4) A means of applying the transformation specified by the Standardization Schema, including:
a) any unification steps that might be necessary
b) any enhancement steps that might be desired
5) A means of returning the resultant data to the Requestor Many of the processes described in other sections of this document which fall outside this scope of these core tasks arise naturally as a Reverse API system is exposed to real-world requirements. For example, if it is possible to retrieve data from a single Data Location it can be useful to compose a single Reverse API Request that will query several Data Locations at once. This necessitates the Unification step—but if a specific Reverse API implementation has no need to query multiple Data Locations simultaneously then the Unification step is superfluous and can be cleanly omitted while being no less a Reverse API process. Also, the Unification step can be hidden entirely from the Administrator if certain behaviors of unification are hard-coded into the implementation of the Reverse API.

Likewise, in a system where the application of a Standardization Schema is sufficient to transform data for general use, an Enhancement step is not required and may be completely absent. As before, specific Enhancements might be hard-coded into the Reverse API system such that the Administrator is given no choice in the process.

Furthermore, the while the Standardization, Unification, and Enhancement steps have been clearly laid out as separate sections in this document, in real-world situations the order of events may become slightly blurred. For example, a mentioned Enhancement was the application of Access Policies against unauthorized access. While this step could very well happen after the Standardization and Unification steps, it could just as well occur immediately after a Request has been retrieved. Likewise, a massively parallel Reverse API process consisting of thousands of individual Data Locations may find it necessary to unify or partially-unify the locally available data streams before they are sent to the formal Unification step. By the same token an especially eager implementation of a Reverse API process might begin on Enhancement tasks prior to formal Unification.

While the specific means by which a Requestor or Administrator connects to and interacts with a Reverse API process are not particularly important, there are a great deal of Enhancements that can be offered at this stage, particularly in the realms of security, authentication, and logging. A Reverse API implementation can contain the means to authenticate users based on its own internal access control lists or tables, usernames, origins, or other identifiers, or it can make use of a networked access control solution, such as Radius or LDAP. A popular Enhancement offered by Reverse API processes is to provide formal logging for data sources that do not natively have said functionality.

Another alternate implementation of the Reverse API process is to separate some of the functions into distinct applications meant to work together. For example, in a situation involving a remote Requestor interacting with a Reverse API system by means of a web browser the Reverse API system itself might be written in a server-side language (PHP, Java, etc.) while the language of the Standardization Schema might be written in JavaScript, with the intention that it be executed on the Requestor's local machine. In such a situation the Reverse API system might resolve the Data Source Locations and either pass them to the remote computer alongside the Standardization Functions, or it might fetch the data indicated by the Locations and pass it unchanged alongside the Standardization Functions. In either case it would be up to the Requestor's web browser to fully complete the Reverse API process by means of browser-executed code. In this fashion the Reverse API system can be broken in two, with part executed on one machine and part executed on another.

What is claimed is:

1. A computer-mediated system for gathering, standardizing, unifying and delivering a user-desired data set from one or more data source locations, comprising:

an interactive text editor software tool executed on a computer for use by an administrator to compose and maintain a library of standardization schema, each schema stored in the library containing a set of data source formulas providing instructions for the system to locate and retrieve data from one or more data sources, each schema also containing a set of data standardization functions providing instructions for the system to handle and process data retrieved from the data sources, the instructions provided by the set of data standardization functions including translation formats for processing data associated with one or more particular data source locations:

a requestor software tool executed on the same or another computer of the system for accessing the library in order that a requestor invokes a selected one of the stored schema; and the same or another computer of the system, responsive to a requestor invoked schema, executing the set of data source formulas of the invoked schema so as to retrieve data and executing the set of data standardization functions of the invoked schema so as to standardize and unify the retrieved data for delivery to the requestor, execution of the data standardization functions including performing, in accord with the translation formats, any required mathematical operations upon data retrieved from respective data source locations in order to result in fully standardized data; and wherein the interactive text editor software tool includes computer-implemented instructions for prompting with management task options associated with creation and editing of data source formulas and data standardization functions, and also includes computer-implemented instructions for executing test-pulls of data in accord with created or edited data source formulas and data standardization functions so as to provide interactive feedback to an administrator on the behavior of composed schema.

2. The system as in claim 1, wherein each data source formula provides either (1) a data source location or (2) a parameterized template resolvable to a data source location with access protocols.

3. The system as in claim 1, wherein one or more schema composed by the administrator further specifies policy barriers to supervise access restrictions to certain specified data for authorized requestors.

4. The system as in claim 1, wherein each schema stored in the library is provided by a unique identifier of that schema.

5. The system as in claim 1, wherein the interactive text editor software tool offers a choice of programming languages to an administrator in which to compose and maintain the library of standardization schema.

6. The system as in claim 5, wherein at least one programming language option is a scripting language.

7. The system as in claim 1, wherein the interactive text editor software tool offers a prepopulated shell of data transformation and formatting options in which to compose or edit standardization functions of the schema.

8. The system as in claim 1, wherein for editing a schema in the library, the interactive text editor software tool populates initial values with existing properties of the schema.

9. The system as in claim 1, wherein a requestor selects a schema to invoke from the library by means of a unique identifier associated with the schema.

10. The system as in claim 1, wherein the system first performs a security scan to validate a requestor prior to executing any data source formula of an invoked schema.

11. The system as in claim 1, wherein execution of a standardization function associated with an invoked schema includes unification data comprising any one or more of concatenation, arrayification, interleaving, specific ordering, or removal of redundancies to result in fully unified data.

12. The system as in claim 1, wherein execution of a standardization function associated with an invoked schema includes data enhancements comprising any one or more of transformation to user-favored numerical formats, reframing into requestor's time zone, filtering of zero/null values, inclusion of relational data, application of metadata, or granular data masking based on access policy data stream.

13. The system as in claim 12, wherein data enhancements implemented by a standardization function begin prior to unification of data from multiple data sources.

14. The system as in claim 1, wherein the system maintains a database of locally available data which is already at least partially standardized and unified in advance of any invoked schema request.

15. The system as in claim 1, wherein a composed schema has a data source formula for only one data source and the standardization function excludes a unification step.

16. The system as in claim 1, wherein the interactive text editor software tool incorporates one or more hard-coded unification or enhancement behaviors that are not offered as administrative options but hidden from an administrator in the creation or editing of schemas.

* * * * *